United States Patent Office 3,519,345
Patented July 7, 1970

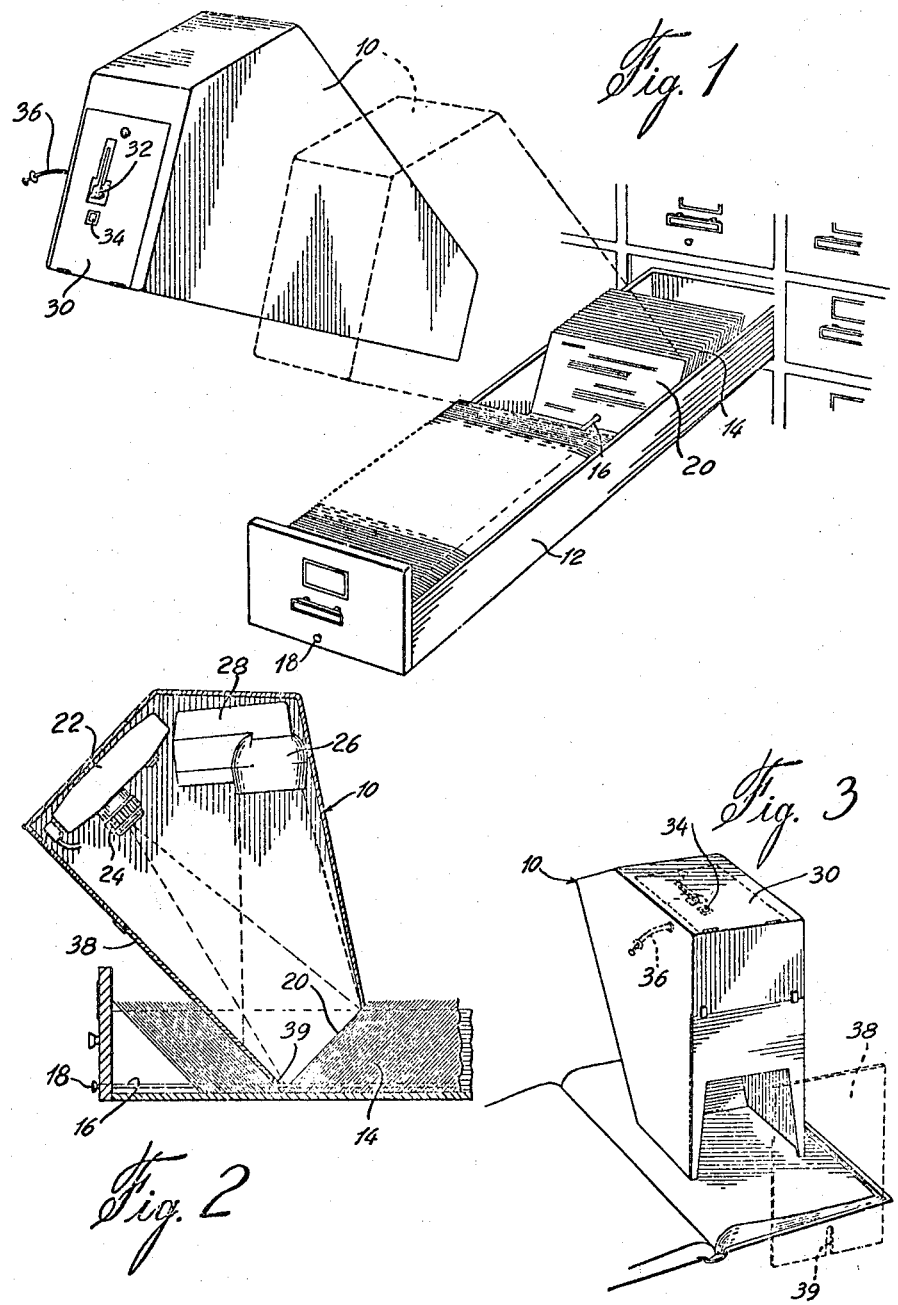

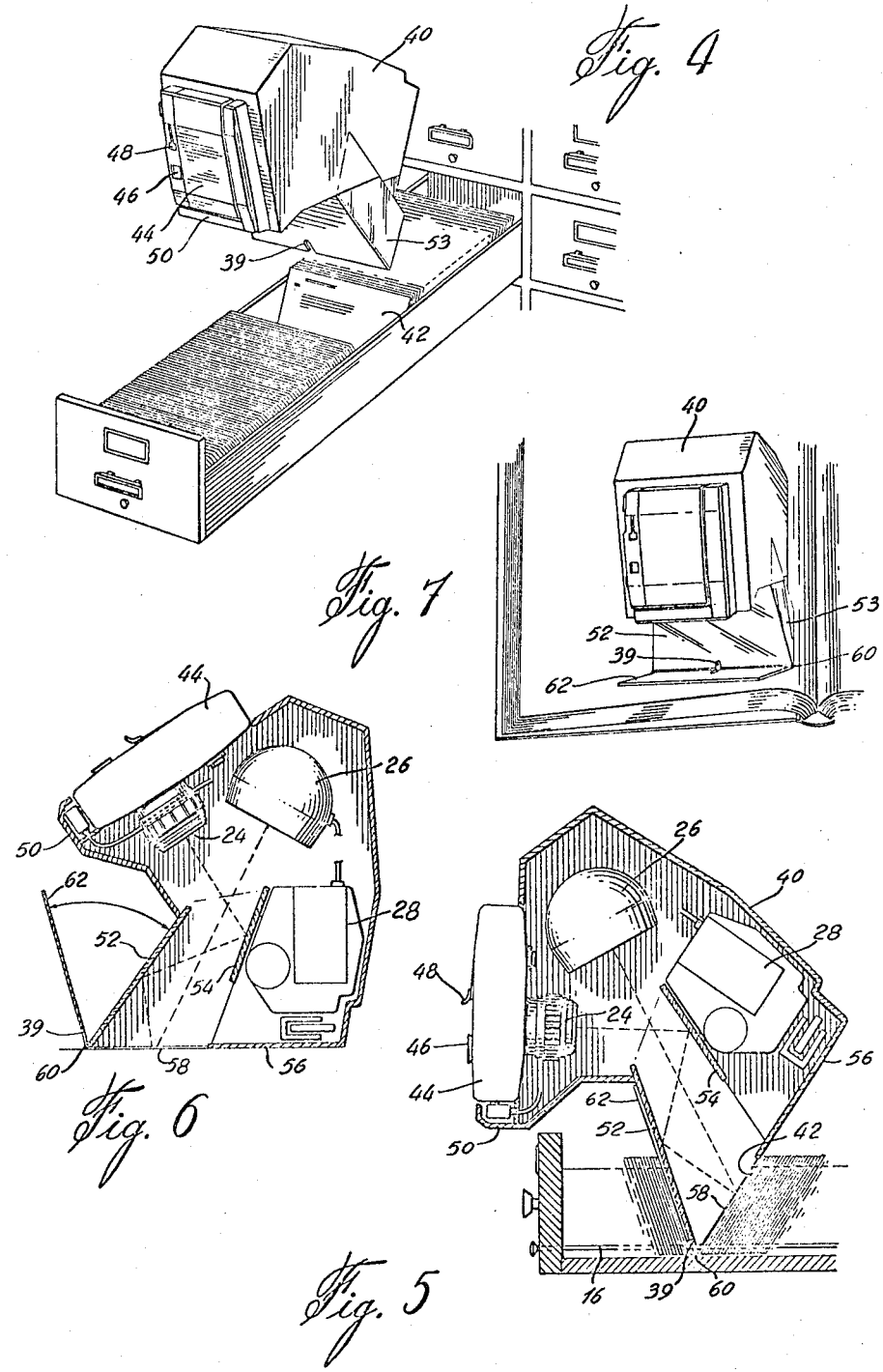

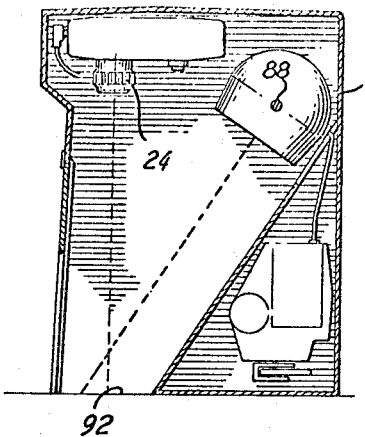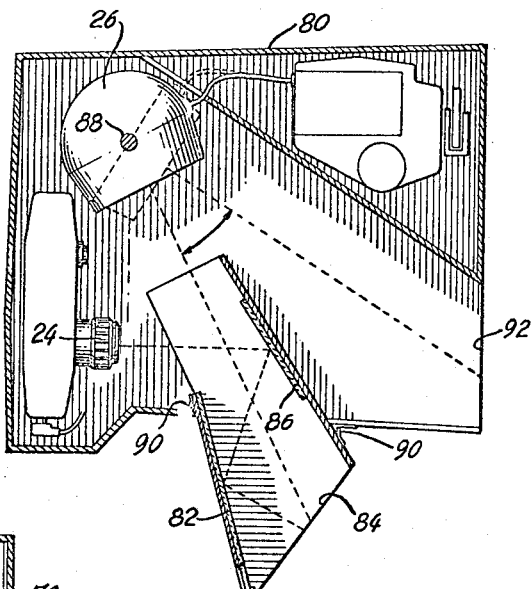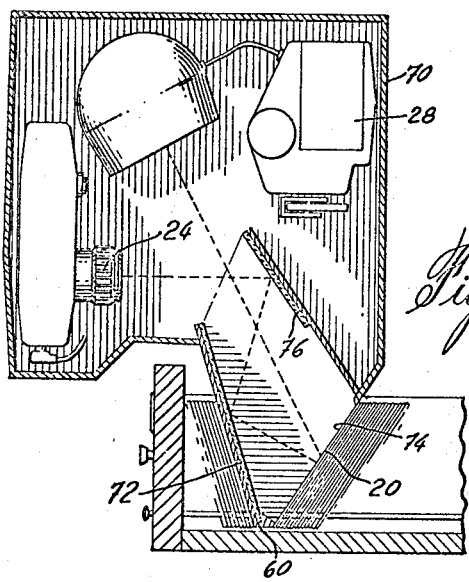

3,519,345
COPYING INSTRUMENT FOR FILED DOCUMENTS
Gérard Mercure, Avenue St.-Alexandre, Limbour, Quebec, Canada, and Jean Thibault, R.R. 1, Rte. 11, Hull, Quebec, Canada
Filed Nov. 27, 1967, Ser. No. 685,785
Int. Cl. G03b 27/70
U.S. Cl. 355—65     8 Claims

ABSTRACT OF THE DISCLOSURE

A self-contained photographic instrument which includes a camera and a light source in a casing, the periphery of the latter including a wedge-shaped member designed for introduction between two tilted catalogue cards in a filing drawer. Once face of the wedge shaped member is provided with an opening facing the card to be copied. The camera and the light are optically aligned with the opening of the wedge-shaped member to photograph the card.

BACKGROUND OF THE INVENTION

Field of the invention

The present invention relates to a photographic instrument for copying documents tiltedly filed on their edges in a filing drawer.

The invention is more specifically directed to a copying instrument for photographing documents without removing them from the filing drawers. The present invention is particularly directed to the copying of catalog cards or index cards in a library.

Description of the prior art

Documents which are in a drawer are usually filed in a specific order. If some of these documents are removed from the drawer, they are liable to be misplaced when returned to the drawer. This is especially true when a great number of these documents need to be removed and returned in various orders and at different times. This is especially true for catalog or index cards in a library which are removed from the drawers for various reasons and which are returned to the drawers in different orders and at different times. Considering that each book, magazine, publication, etc. may be found by the card index, it means that if an index card is lost, the corresponding book, magazine or publication is lost for all practical purposes.

Furthermore, a good classification of such index cards may represent years of efforts and considerable expenses. Consequently, small libraries may have to refer regularly to larger ones for completing their own classification. In order to provide information to other libraries, cards are removed from their filing drawers which means that they may be lost or misplaced.

Index cards are not removed in libraries for the benefit of the readers who are compiling bibliographies. The compilation of the details appearing on the cards is a long and tedious work which requires and exact transcription according to prescribed forms. The omission of a date or a descriptive element when a card is handcopied forces the user to return to the reference documents.

Many libraries are also members of a collective catalog, which means that they provide the union catalog with a copy of the index cards corresponding to their holdings. For this purpose, the cards have to be removed from the drawers in order to be photographed. The reclassification of these cards requires many hours of work and does not eliminate the danger of misfiling or losing of said cards.

Furthermore, many libraries are now objecting to the removal of the index cards for photocopying the same. An exceptional authorization may be granted, but a marker must be substituted for the cards, the alphabetical or numerical order of the cards must be maintained among the cards withdrawn from the drawers, the withdrawn cards must be supplied to a special photocopying service, and upon the return of these photocopies, the index cards must be reclassified and the marker destroyed. This manipulation requires long delays which are costly and does not eliminate the danger of misfiling some cards.

SUMMARY OF THE INVENTION

In order to overcome the above-mentioned disadvantages, the present invention is directed to a photographic instrument which enables the copying of the reference cards in the filing drawer without removing the said cards therefrom. The new instrument is portable, may be easily operated and a requires a minimum of installation. The camera is adapted to precisely frame the document. A view-finder or other visual alignment means may be dispensed with.

The present invention enables the copying of filed documents in a much shorter time than is usually required. The economy of time is further increased if the reference cards are held in the filing drawer by a retaining rod.

The instrument preferably uses a low intensity flashing light which enables to obtain a great number of flashes with the same battery and the same lamp. The "Wink-Lite" which is usually used as a fill-in light in photography, is particularly well adapted for the present instrument. It enables to obtain 1,000 to 2,000 flashes without changing the batteries and its charging time is rather negligible.

According to the invention the self-contained photographic instrument for copying documents tiltedly filed edgewise in a filing drawer comprises a casing having a hollow wedge-shaped member at the periphery of the casing, one face of the wedge-shaped member has an opening therein, a camera which is located in the casing has an objective mounted to photograph a document in the plane of the opening of the said member in a perpendicular direction with the optical axis of the objective, lighting means located in the casing adapted to provide a low intensity flashing light beam in the direction of the said opening upon actuation of the camera, whereby the wedge-shaped member is adapted to be introduced between the said tilted documents in the filing drawer, the opening of the wedge-shaped member being applied against the document to be copied.

DESCRIPTION OF THE DRAWING

FIG. 1 is a perspective view of an embodiment of the copying instrument above a referenced card filing drawer;

FIG. 2 is a cross-sectional view of the copying instrument inserted in the filing drawer between reference cards;

FIG. 3 is a perspective view of the copying instrument positioned over the page of a book;

FIG. 4 is a perspective view of a different embodiment of the copying instrument shown over a filing drawer for reference cards;

FIG. 5 is a cross-sectional view of the embodiment shown in FIG. 4 positioned in a filing drawer among the reference cards;

FIG. 6 is a cross-sectional view of the embodiment shown in FIG. 5 positioned to photograph a horizontal document;

FIG. 7 is a perspective view of the embodiment shown in FIG. 6 positioned over a book;

FIG. 8 is a different embodiment of the copying instrument positioned in a filing drawer between reference cards;

FIG. 9 is a cross-sectional view of a different embodiment of the copying instrument including a removably mounted wedge-shaped member adapted to be introduced between the reference cards of a filing drawer;

FIG. 10 is a cross-sectional view of an embodiment as shown in FIG. 9 in which the wedge-shaped member has been removed and is adapted to photograph a horizontal document.

DESCRIPTION OF THE PREFERRED EMBODIMENTS

In FIG. 1, the copying instrument 10 is illustrated in solid lines above the filing drawer 12 and in dotted lines in its operating position, that is, with its front part introduced between the reference cards 14 in standard filing drawers used in libraries. Reference cards 14 are filed edgewise and are preferably retained to the bottom of the drawer by a rod 16 which may be easily removed by the knob 18 at the front of the drawer. A compressor may be used at one end of the drawer to keep the cards together but in order to permit the reading of the cards, a space must be left between the cards and the compressor so as to enable the cards to be tilted as shown in FIGS. 1 and 2. The minimum distance between the cards and the compressor is approximately ¾ to 1¾ inch which gives a reading angle of about 30°. In order to enable the copying of the reference cards according to the present invention, an angle of about 50° is preferred and a spacing within the drawer of 2 inches to 2¾" is then needed depending upon the type of drawer. However, the present copying instrument is not restricted to a specific tilting of the cards. In FIGS. 1 and 2, the lower or front end of the casing 10 is wedge-shaped with an angle of 90° and may be lowered among reference cards oppositely tilted so as to photograph reference card 20. The wedge-shaped part of the casing 10 has an opening on one face of the wedge shape and the said face is applied against the card 20 to be copied. This opening is dimensioned so as to frame the card 20 without eliminating any written matter appearing on the card. The edges of the opening will rest on the edges of the card 20 so as to provide a support for the casing 10 and the proper alignment for the copying operation.

The casing 10 encloses a camera 22 which is preferably a miniature camera adapted to take 16 mm. frames or half frames of a 35 mm. The objective of the camera is oriented so that its optical axis is perpendicular to the plane of the opening of the casing. A light source 26 is also mounted within the casing and projects a light beam in the direction of the card 20. This light source is preferably an electronic flash of the "Wink-Lite" type and is connected to a power pack 28 which makes the instrument self-contained. It is obvious that the light source could be of the continuous type and the power supply could be received from an alternative current source.

As shown in FIGS. 1 and 2, a hingedly mounted back plate 30 retains the camera 22 which is provided with a lever 32 to move the film in the camera and with a viewer 34 to look at the document 20. The shutter release 36 is connected to the camera for simultaneously actuating the camera and the light source 26. The viewfinder may be dispensed with.

A portion 38 of the lower wall of the casing 10 may be transparent and removable as shown in FIG. 3 so as to enable the operator to view the photographed document 20 without requiring the use of the viewer 34. The plate 38 is provided with a notch 39 which engages the rod 16 and facilitates the framing of the card and the adjustment of the casing 10 within two oppositely tilted reference cards and the side flanges of the filing drawer 12.

In library work, the copying of a text from a book is often needed for reference purposes. It may be seen from FIG. 3 that the casing 10 may be mounted over the page of a book so as to copy directly the text contained thereon.

FIGS. 4, 5, 6 and 7 show a different embodiment of the invention. FIG. 4 shows a copying instrument 40 in a position to be lowered between two oppositely tilted reference cards, in order to photograph reference card 42 located in the filing drawer. The camera 44 is in an upright position to enable the operator to look through the viewer 46 and to actuate the film by the handle 48. With this arrangement, no back plate is needed because the camera is mounted in a support 50 so that the objective 24 faces inside the casing. The upright position of the camera 44 results from the arrangement of two facing mirrors 52 and 54 which reflect the image of the copied document 42 from mirror 52 to mirror 54 respectively and into the objective 24. The casing 40 is provided with a wedge-shaped member formed by the mirror 52 on one side and the wall 56 on the other side, the latter having an opening 58 therein. The opening 58 may be covered by a transparent plate. The beam of the light source 26 is oriented in the direction of the opening 58 and power pack 28 is fixed behind the mirror 54. The wedge-shaped part of the instrument 40 may be easily positioned between the oppositely tilted cards so as to photograph card 42 which is applied against the opening 58. The relative weight and position of the camera 44, the light source 26 and the power pack 28 enable to obtain an equilibrium of the instrument 40 when the casing rests on the apex 60 of the wedge-shaped portion. The camera is connected to the light source so that when the shutter is operated, a simultaneous light beam is projected on the copied document.

The copying instrument 40 as shown in FIG. 5 may be used also to photograph a horizontal document as shown in FIGS. 6 and 7. In order to facilitate the positioning of the casing over the text to be copied, the mirror 52 is semi-transparent and a flat opaque mask 62 is pivotally mounted at the apex 60. When the mask 62 is pulled away from the mirror 52 as shown in FIG. 6, the photographer is able to see through the semi-transparent mirror 52 to properly position the casing. When the instrument 40 is used as shown in FIG. 5, the mask 62 is placed in contact with the mirror 52. A notch 39 is also provided with the present arrangement to facilitate the positioning of the instrument over the guiding rod 16 in the drawer.

The wall 56 extends in the same plane as the opening 58 and enables to support the casing when positioned as shown in FIGS. 6 and 7. FIG. 8 illustrates a different embodiment wherein the casing 70 has a substantially square cross-section provided at its lower end with a wedge-shaped member constituted essentially by the mirror 72 and the opening 74 and a mirror 76 facing the mirror 72 so as to project the image of the document 20 in the objective 24 by the subsequent reflection in mirrors 72 and 76. This embodiment differentiates from the embodiment of FIG. 5 essentially by the position of the power pack 28.

The relative position of the camera, the power pack and the light source are mounted in view of the apex 60 of the wedge-shaped member so as to counterbalance the weight of the instrument when the latter is in its position of use, that is, resting on the apex 60. This balance of weight does not have to be very precise because the instrument is well supported by the two oppositely tilted reference cards on which the mirror 72 and the opening 74 are resting and by the hand of the operator.

FIG. 9 illustrates a modified casing wherein the wedge-shaped member is removably mounted on the said casing. The wedge-shaped member includes two oppositely mounted mirrors 82 and 86 determining an opening 84 at the lower end of the wedge-shaped member. The wedge-shaped member is fastened to the casing 80 by a pair of hooks 90 which enable its removal when not needed.

The casing 80 is also provided with a second opening 92 which enables to photograph the documents on a horizontal flat surface as shown in FIG. 10. In order to obtain the twofold utility of the casing 80, the light source 26 is pivoted about an axis 88 so as to illuminate selectively the opening 84 or the opening 92. As may be seen in FIGS. 9 and 10, the plane of the opening 92 is perpendicular to the optical axis of the lens 24.

The wedge-shaped member in all the casings described above is preferably shaped with an angle of between 30° and 90° with an optimum angle of 50°. The selected angle applies to the standard catalog cards which have a dimension of 12.5 x 7.5 cm. A test carried out with a lens having a focal length of 38 mm. indicated that a minimum distance of about 2¼" between the two mirrors was needed.

Although a camera having a lens with a fixed focal length is normally used, a zoom lens will be preferred if a selective part of the document must be photographed.

Copying films having a high contrast are generally used with this instrument. The film obtained is subsequently processed and printed. The printing is preferably made directly from the microfilm by an automatic xerographic machine having a high speed of operation. If immediate copies are needed from the negative, cameras which produce prints such as the cameras known by the trademark "Polaroid" may be used. The size of the film may vary with the size of the documents to be printed. For standard catalogue cards, a 16 mm. film or half frames of a 35 mm. film may be used.

The lighting means used in this instrument may be directly connected to an alternative current power supply but a self-contained electronic flash actuated by a power pack is more convenient for this work. A source of light such as disclosed in Canadian Pat. No. 669,733, issued on Sept. 3, 1963, is advantageously used. A ring-type flash head mounted around the objective constitute an interesting illuminating combination.

Another advantage of the present invention consists in the possibility for the present instrument to photograph the reverse side of the card. It is well known that catalog cards used as references or for classification purposes often contain additional entries on their reverse side. For this purpose, the copying instrument is rotated 180° about a vertical axis and the card which has just been photographed on its front side may then be flipped over and photographed on its reverse side. In this manner, the film will show in a continuous manner the front and the reverse sides of the same card except that the reverse side will appear upside down. When these two parts will be printed as for instance by a continuous xerographic machine for microfilms, the same sheet containing one above the other the reverse and the front sides of the card will be folded in two so that the reverse side will have the proper orientation to be read normally as the front side.

When the instrument is used to copy a horizontal document such as a sheet in a book as shown in FIG. 7, the lateral walls 53 of the wedge-shaped member are made of a transparent or translucent material. This natural lighting is needed to properly frame the text to be copied if the light received through the semitransparent mirror 52 is not sufficient or if the mirror 52 is opaque.

The lateral walls 53 may be opaque if a continuous light source is used or if an auxiliary light is available to illuminate the card so that the latter may be seen through the viewer or the transparent mirror 52.

It should be obvious that many modifications may be contemplated by a person skilled in the art without departing from the purport of the invention described above.

We claim:
1. A self-contained photographic instrument adapted to copy documents tiltedly filed edgewise in a filing drawer, the said instrument comprising a casing having a hollow wedge-shaped member at the periphery of the casing, one face of the said wedge-shaped member having an opening therein, a camera in said casing having an objective mounted to photograph the plane of the opening of said member in a substantially perpendicular direction, two facing mirrors located between the opening and the objective, for changing the direction of the optical path, one of the said mirrors being located on the face of the wedge-shaped member adjacent the opening, lighting means in said casing adapted to provide a light beam in the direction of the said opening, the angle of the wedge-shaped member being dimensioned so as to be inserted between oppositely tilted documents in the filing drawer, the size of the opening of the wedge-shaped member corresponding to the size of the document to be copied.

2. A photographic instrument as recited in claim 1, wherein the lighting means comprise a flashing light source and a power pack for energizing the light source upon actuation of the camera, the weights of the camera, the light source and the power pack being disposed within the casing so as to provide a substantial equilibrium upon the apex of the wedge-shaped member.

3. A photographic instrument as recited in claim 1, wherein the face of the wedge-shaped member adjacent the opening is transparent.

4. A photographic instrument as recited in claim 1, adapted to be inserted in a filing drawer which has a longitudinal guiding rod for the documents at the bottom of the said drawer, wherein the apex of the wedge-shaped member has a transverse notch adapted to sit over the said guiding rod.

5. A photographic instrument as recited in claim 1, wherein the said wedge-shaped member is removably connected to the casing.

6. A photographic instrument as recited in claim 1, wherein the said one mirror is partly transparent.

7. A photographic instrument as recited in claim 1, wherein the casing is provided with a second opening facing the objective of the camera and the light source is pivotally mounted so as to project selectively towards the one or second opening.

8. A photographic instrument as recited in claim 6, wherein an opaque flat mask is pivotally mounted at the apex of the wedge-shaped member and adapted to cover the partly transparent mirror.

References Cited

UNITED STATES PATENTS 2,813,456   11/1957   Ostrov _____ 355—21

NORTON ANSHER, Primary Examiner

R. L. MOSES, Assistant Examiner

U.S. Cl. X.R.

355—21